US012416448B2

(12) United States Patent
Pächnatz

(10) Patent No.: US 12,416,448 B2

(45) Date of Patent: Sep. 16, 2025

(54) FREEZE DRYING PLANT AND METHOD

(71) Applicant: Torsten Pächnatz, Erfurt (DE)

(72) Inventor: Torsten Pächnatz, Erfurt (DE)

( * ) Notice: Subject to any disclaimer, the term of this patent is extended or adjusted under 35 U.S.C. 154(b) by 785 days.

(21) Appl. No.: 17/703,404

(22) Filed: Mar. 24, 2022

(65) Prior Publication Data

US 2022/0307767 A1 Sep. 29, 2022

(30) Foreign Application Priority Data

Mar. 24, 2021 (DE) .................... DE202021101537.3

(51) Int. Cl.

*F26B 5/06* (2006.01)
*F26B 5/02* (2006.01)

(52) U.S. Cl.

CPC . *F26B 5/06* (2013.01); *F26B 5/02* (2013.01)

(58) Field of Classification Search

CPC .................................... F26B 5/02; F26B 5/06
USPC ........................................................... 34/523
See application file for complete search history.

(56) References Cited

U.S. PATENT DOCUMENTS 5,230,162 A * 7/1993 Oyler, Jr. ................ F26B 5/065 34/292
6,233,844 B1 * 5/2001 Gallego Juarez ........ A23B 2/97 34/256
7,836,606 B2 * 11/2010 Gehrmann ............. F26B 5/065 34/284
8,516,714 B2 * 8/2013 Biemans .................. A61K 9/19 62/50.7
9,671,166 B2 * 6/2017 Plavnik .................. G10K 15/04
11,137,206 B2 * 10/2021 Corbin, III ........... A01N 1/0289
11,473,839 B2 * 10/2022 Pachnatz ................. F26B 5/044
11,609,042 B2 * 3/2023 Parakininkas ....... A01N 1/0284
11,732,964 B2 * 8/2023 Patel ..................... F26B 25/063 34/237
11,747,082 B2 * 9/2023 Parakininkas .......... G01F 22/00 34/296
11,815,311 B2 * 11/2023 Johnson ............... A01N 1/0289
12,085,337 B2 * 9/2024 MacKay ................. F26B 5/044
2022/0307767 A1 * 9/2022 Pächnatz .................. F26B 9/06

FOREIGN PATENT DOCUMENTS

CN 101126593 A 2/2008
CN 203385265 U 1/2014
CN 104677066 A 6/2015
CN 111971519 A 11/2020
DE 2537850 A1 3/1977
DE 102015216725 A1 3/2017
DE 102016003859 A1 10/2017
(Continued)

*Primary Examiner* — Stephen M Gravini

(74) *Attorney, Agent, or Firm* — Dinsmore & Shohl LLP

(57) ABSTRACT

A freeze drying plant for drying products containing liquid has a vacuum chamber configured to receive the products. A reception device has at least one reception plate onto which the products can be applied. A cooling system has a fluid circuit configured to cool and/or to heat the products by a cooling fluid conducted in the fluid circuit. The reception plate has at least one closed fluid space that is connected to the fluid circuit and that cooling fluid flows through. At least one sound generator introduces ultrasound into the products during a drying phase, with the sound generator disposed in the fluid space and being able to be flowed around by cooling fluid.

14 Claims, 2 Drawing Sheets

(56) References Cited

FOREIGN PATENT DOCUMENTS

| | | | | | |
|---|---|---|---|---|---|
| DE | 102018105395 | A1 | | 9/2019 | |
| DE | 202021101537 | U1 | * | 6/2021 | ............ F26B 21/086 |
| EP | 4063774 | A2 | * | 9/2022 | ............ F26B 21/086 |
| EP | 4063774 | B1 | * | 4/2024 | ............ F26B 21/086 |
| KR | 20100102663 | A | * | 9/2010 | |
| WO | 2016180558 | A1 | | 11/2016 | |
| WO | 2019/192747 | A1 | | 10/2019 | |

* cited by examiner

FREEZE DRYING PLANT AND METHOD

REFERENCE TO RELATED APPLICATION

This application claims priority to German application No. DE 20 2021 101 537.3, filed Mar. 24, 2021, the entire content of which is incorporated herein by reference.

FIELD OF THE INVENTION

The invention relates to a freeze drying plant for drying products containing liquid having a vacuum chamber for receiving the products containing liquid within the vacuum chamber, wherein a reception device is provided having a reception plate onto which the products containing liquid can be applied, and wherein a cooling system having a fluid circuit is configured to cool and/or to heat the products by means of the cooling fluid conducted in the fluid circuit.

BACKGROUND OF THE INVENTION

Freeze drying, that is known per se, is a method for the gentle evaporation of the most varied solvents that are, for example, present in foodstuffs, in medicines, and the like as a condition of manufacturing or in a natural manner.

Freeze drying plants serve the performance of the method of freeze drying and the drying takes place by the evaporation of the solvent in the product itself. The solvent, and the frozen liquid is meant by this, in this process has to transition directly, and without any prior transition from the solid phase into the liquid phase, from the frozen state into the gaseous state, which is called sublimation. To this extent, the product is introduced into the vacuum chamber in the frozen state or is transitioned into the frozen state in it. The liquid can subsequently already be sublimated at considerably lower temperatures by the generation of a vacuum so that the product is not subject to high thermal load. The low thermal load in this process enables the maintenance of the properties of the product, for example the maintenance of oils, aromas, and further, preferably flavorful properties, as well as of the consistency of the product or the maintenance of certain temperature-sensitive properties of drugs.

A known example for the use of freeze drying is the manufacture of so-called instant coffees that are manufactured using freeze drying, in particular also to maintain the aromatic substances in soluble coffee for later enjoyment. In addition to the maintenance of the original properties of the products, the excellent solubility of the freeze dried product with nevertheless removed liquid and the storage at room temperature are above all advantageous.

Freeze drying plants as a rule comprise a vacuum chamber for receiving the products, for which purpose spaces that can be cooled and heated are formed in the vacuum chamber and a condenser is provided that is as a rule accommodated in a condenser chamber separable from the reception space.

The product is, for example, first frozen outside the vacuum chamber and is introduced into the vacuum chamber that is subsequently closed and evacuated. The product is then heated in the generated vacuum and consumed sublimated energy is supplied again in the course of the drying. The condenser in this process is cooled to low temperatures by a refrigeration unit to again condense the liquid sublimated from the product from the vapor phase on the surface of the condenser, but without the liquid evaporating again.

Versatile parameters such as the cooling rate, the freezing temperature, the vacuum in the vacuum chamber, the space temperature to receive the products, and, for example, the length of the main drying enter into the freeze drying process, whereby the complexity of the method already becomes clear. Due to the complex process management, precise measurement and control techniques for the detection of the temperature and of the pressure as well as of further parameters are required for the optimization of the freeze drying process.

The freeze drying is generally divided into three part steps that are delineated from one another in time, that is the freezing, the main drying, and the final drying. The contained liquid is frozen by the lowering of the temperature in the product, with it having to be noted that the freezing point of the liquid is further lowered by the dissolved substances. The vacuum is thereby produced and the pressure is lowered to a value that is below the freezing point of the liquid in the phase diagram. The pressure value to be set is substantially oriented on the liquid temperature to be maintained and is determined with the aid of the vapor pressure curve.

The actual drying process takes place exclusively by sublimation of liquid in the product under the set pressure vacuum. The sublimation energy consumed in the main drying for the removal of the liquid from the product is supplied to the product again in the form of heat in the reception device. For this purpose, the reception devices as a rule have receiving plates and a fluid circuit and a fluid can be conducted via the fluid circuit through corresponding fluid passages in the receiving plate.

Silicone oil is used as the fluid, for example. As the drying of the product progresses, the layer thickness of the dried product also grows from the outside to the inside in this process and the sublimation rate are. To maintain the sublimation, the space temperature on the surface of the receiving plates is continuously increased, with the maximum temperature, however, being limited in order not to damage the product, in particular such that no thawing of the liquid contained in the product occurs. Pressures of, for example, 1 mbar to 10 mbar are typical in the main drying here. In the final drying the remaining liquid that is still bound in the product matrix is withdrawn. In practice, the temperature of the spaces on the receiving plates is increased still further here while the lowest achievable pressure in the vacuum chamber of, for example, 3 mbar to 10 mbar is implemented.

Known freeze drying plants are designed such that the vacuum chamber is, for example, separated from the condenser chamber via a partition wall and an intermediate valve introduced into the partition wall. Once the sublimation has started and the vapor pressure in the vacuum chamber increases, the valve is opened and the solvent vapor, for example water vapor, can move into the condenser chamber and precipitate on the surface of the condenser. The condensers, for example, comprise cooling coils and are cooled via a compressor to low temperatures by a refrigerant. After the end of the drying process, the vacuum chamber and as a rule also the condenser chamber are vented to normal pressure again.

A freeze drying plant for drying products containing liquid is known from CN 104677066 A having a vacuum chamber that is configured to receive the products containing liquid, wherein a reception device is provided with at least one reception plate onto which the products containing liquid can be applied, and wherein a cooling system having a fluid circuit is configured to cool and/or to heat the products by means of the cooling fluid conducted in the fluid circuit. Sound generators are arranged below the spaces of the products on the reception plates to introduce ultrasound into the products to be dried. In accordance with an embodiment, a fluid space is formed beneath the reception plate, with the sound generators from the side remote from the vacuum chamber then being arranged at the outer side of the fluid space and having to introduce sound through the cooling fluid to introduce ultrasound into the product.

It is as a rule customary to supply the product with ultrasound before the introduction into the vacuum chamber, in particular in the freezing phase, to promote ice crystallization in the freezing process of the liquid in the product, whereby the subsequent sublimation in the vacuum chamber can be improved and can above all be performed faster. To promote the drying process of the product in the vacuum chamber and at vacuum atmosphere, the ultrasound is as a rule no longer used as an accompanist thereto.

A freeze drying plant for drying products containing liquid is known from WO2019/192747 having a vacuum chamber for receiving the products containing liquid within the vacuum chamber, wherein a reception device is provided with a reception plate onto which the products containing liquid can be applied, and wherein a cooling system having a fluid circuit is configured to cool and/or to heat the products by means of the cooling fluid conducted in the fluid circuit. It is proposed here to configure at least one sound generator to introduce sound into the cooling fluid itself to conduct the ultrasound to the product by means of the cooling fluid.

SUMMARY OF THE INVENTION

The object of the invention is an improvement of a freeze drying plant for drying products containing liquid. The use of ultrasound as a supporting medium in the drying of the products containing liquid should in particular be improved, preferably to accelerate the drying process and to achieve a simpler setup of the freeze drying plant as a result.

This object is achieved starting from a freeze drying plant for drying products containing liquid in accordance with the disclosure herein and having the respective characterizing features. Advantageous further developments of the invention are also set forth.

To improve the freeze drying plant, the invention provides that the reception plate has at least one closed fluid space that is connected to the fluid circuit and that can be flowed through by the cooling fluid, and with at least one sound generator being provided to introduce ultrasound into the products during a drying phase, with the sound generator being configured in the fluid space and being able to be flowed around by cooling fluid.

The heart of the invention is the arrangement of the at least one or more sound generators within a fluid space that is formed in the reception plate and onto which the products can be applied that are intended for drying. If the sound generators are directly integrated in the reception plate, the product can be applied to the upper side of the product via a surface of an upper plate wall and the sound generators can be arranged directly on the lower side of the same plate wall.

A substantially more intense introduction of ultrasound into the products to be dried is thereby achieved. The reception plate can be designed such that it has a plurality of spaces on a support surface at the upper side or the reception plate has a peripherally elevated marginal region that makes it possible to apply products to be dried to the reception plate as bulk material. The fluid space here enables a superficial cooling or superficial heating of the upper plate wall so that an optimum heat transfer can be achieved by the cooling fluid either into the product or out of the product. The heat transfer only has to take place through the upper plate wall so that both the heat transfer over the surface is homogenized and thus optimized and the introduction of ultrasound is intensified.

This optimization is achieved by the use of the upper plate wall as a boundary of the fluid space, on the one hand, and as a reception wall for receiving the sound generators, on the other hand. The fluid here wets the inner side of the upper plate wall over the full surface to the extent that the remaining surface, for example between a plurality of sound generators, is wetted or flowed around by cooling fluid.

The reception plate is in particular designed with a superficial extent and has a double-wall design having an upper plate wall and having a lower plate wall preferably spaced apart in parallel, with the upper plate wall having the respective arrangements and functions having already been described above. The superficial fluid space extends between the upper plate wall and the lower plate wall, with the at least one support surface for supporting the products being formed on the upper side of the upper plate wall and with the at least one sound generator being arranged on the lower side of the upper plate wall.

The transducer is considered as the sound generator in the present case so that the transducer or also the sonotrode is fastened to the lower side of the upper plate wall. A unit that stimulates the ultrasound by means of an electric current can to this extent also be arranged outside the fluid space, for example at the lower side of the lower plate wall.

The freeze drying plant is further advantageously configured such that a coolable condenser is present at which fluid from a vapor phase can be deposited that is withdrawable from the products of a drying phase of the process. The condenser at which the liquid from a vapor phase withdrawn from the products can be deposited can be formed as a cooling coil, with a condenser unit that is fluidically connected to the coolable condenser being able to be provided outside the freeze drying plant as a peripheral unit.

A condenser chamber that is connected to the vacuum chamber by means of an intermediate valve can be provided to receive the condenser. If the vapor pressure of the sublimated liquid within the vacuum chamber increases to a certain value, the intermediate valve can be opened at the appropriate time so that the liquid can be deposited on the condenser from the vapor phase. The liquid vapor here flows from the vacuum chamber through the intermediate valve into the condenser chamber.

An advantageous arrangement has alternatively also been established in accordance with which the coolable condenser is configured together with the introducible products in the vacuum chamber. In accordance with this variant, a condenser chamber that is connected to the vacuum chamber via an intermediate valve is dispensed with. Trials have shown advantageous drying cycles in very short drying times in which the products were able to be dried in multiple repetitions, with the liquid already being able to be deposited on the coolable condenser within the vacuum chamber. The advantageous arrangement in particular results in conjunction with the introduction of ultrasound into the products to be dried of configuring the coolable condenser within the vacuum chamber.

In accordance with a further particularly preferred aspect of the freeze drying plant, the reception plate forms a base plate of the vacuum chamber that bounds the vacuum chamber at the bottom side. The advantage is thus achieved that the sound generator that is arranged in connection with the reception plate does not have to be configured within the vacuum chamber, whereby the electrical connections are also simplified. The reception plate can thus be integrated in the structure of the vacuum chamber such that both the fluid connections for the flowing through of the fluid space with cooling fluid and the electrical connection of the sound generators can be configured outside the vacuum chamber. It is in particular of advantage if the upper plate wall is formed as part of a housing body surrounding the vacuum chamber. This housing body here also comprises the base plate, with it in particular being conceivable that a side wall or a top-side wall is formed by means of the upper plate wall of the reception plate in dependence on the form in which the product to be dried is present, for example as bulk material.

It is thus by all means conceivable that the bulk material is bounded by an upper plate wall of a reception plate both by the lower side and by the upper side so that both a heat exchange and an introduction of ultrasound into the product take place into the product from at least two sides or from a plurality of sides. If the upper plate wall is formed as a base plate of the vacuum chamber, only one reception plate is preferably located in the freeze drying plant, in particular in a construction unit with the housing of the vacuum chamber.

There is, however, naturally also the possibility of arranging a plurality of reception plates above one another within the vacuum chamber. A reception plate can here also form the base plate of the vacuum chamber and further reception plates are located within the vacuum chamber, for example in that the reception device is configured in the manner of shelves and has a plurality of levels that are formed by the reception plates and into which the products to be dried can be introduced. To this extent, the reception device for receiving a plurality of products can have a plurality of reception plates that are arranged in levels above one another, that are formed with the respective fluid spaces, and in which the respective sound generators are integrated. The plurality of reception plates are here connected to the outer fluid circuit of the cooling system via a pipe system, with the pipe system thus being configured as a part of the fluid circuit within the vacuum chamber.

If the coolable condenser is located in the vacuum chamber, it can be designed such that the coolable condenser surrounds or encompasses the reception device and thus the products to be dried, for example in the form of a ring.

The sound generators can be arranged in a multiple arrangement next to one another at the lower side of the upper plate wall within the fluid space, with the sound generators preferably having a dish shape with a sound surface by which the sound generators are arranged at the upper plate wall so that ultrasound can be superficially introduced into the upper plate wall.

The sound generator can be formed to introduce ultrasound into the products at an ultrasonic frequency of 10 kHz to 100 kHz. A sound device can be provided for this purpose to which one or more sound generators are in particular connected, with the sound device being formed to introduce ultrasound into the products at an ultrasonic frequency of 10 kHz to 100 kHz in operative connection with the at least one sound generator.

It is particularly advantageous if the sound device is configured to introduce the ultrasound into the products in a pulsed manner in operative connection with the sound generator. The sound device can, for example, be configured in operative connection with the sound generator to introduce ultrasound into the products by pulses in the range of infrasound of 0.1 Hz to 20 Hz.

BRIEF DESCRIPTION OF THE DRAWINGS

Further measures improving the invention will be shown in more detail below together with the description of preferred embodiments of the invention with reference to the Figures. There are shown.

DETAILED DESCRIPTION OF THE INVENTION

Figure 1:
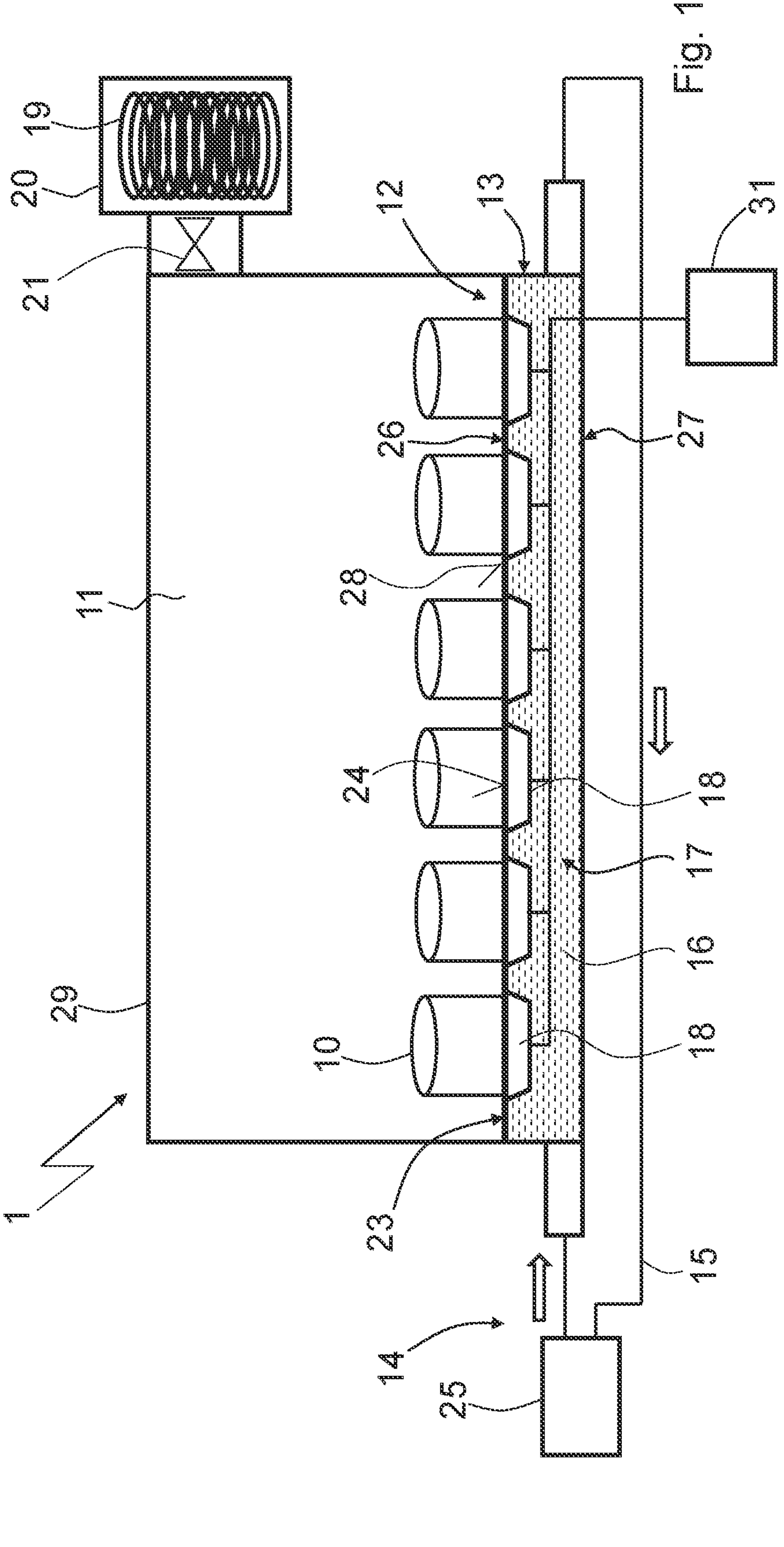
FIG. 1 is a schematic view of an embodiment of a freeze drying plant having a reception plate in accordance with the invention as a base plate of the vacuum chamber.

FIG. 1 shows a freeze drying plant 1 that serves the drying of products 10 containing liquid, wherein the products 10 are represented as unit material and the products 10 containing liquid can also be bulk material.

The products 20 are received on a reception device 12 that comprises a single reception plate 13 by way of example. The reception plate 13 has a sandwich-like structure and has an upper plate wall 26 and a lower plate wall 27. A fluid space 17 that is filled with cooling fluid 16 is configured between the upper plate wall 26 and the lower plate wall 27.

The cooling fluid 16 is connected to a fluid circuit 15 that is either heated or cooled via a unit 25 depending on the phase of the cooling or heating of the products 10 in the freeze drying process of the freeze drying plant 1.

The upper plate wall 26 is designed in accordance with this embodiment as a base plate 23 of the housing body 29 of the vacuum chamber 11. To this extent, the base plate 23 and the upper plate wall 26 of the reception plate 13 form a unitary component, with a plurality of sound generators 18 being arranged on the lower side of the upper plate wall 26. The sound generators 18 are located at a respective position of the superficial reception plate 13 that coincides with the placement position of the products 10. If the sound generators 18 are operated, ultrasound can be introduced into the products 10 through the upper plate wall 26 or through the base plate 23. Furthermore, a facilitated heat transfer either into the product 10 if the cooling fluid 16 is heated or from the product 10 if the cooling fluid 16 is cooled by the wetting of the lower side of the upper plate wall 26 from the direction of the fluid space 17. The sound device 31 arranged outside the vacuum chamber 11 generates ultrasound by the sound generators 18, with the number of sound generators 18 shown being operated together by the one sound device 31.

Figure 2:
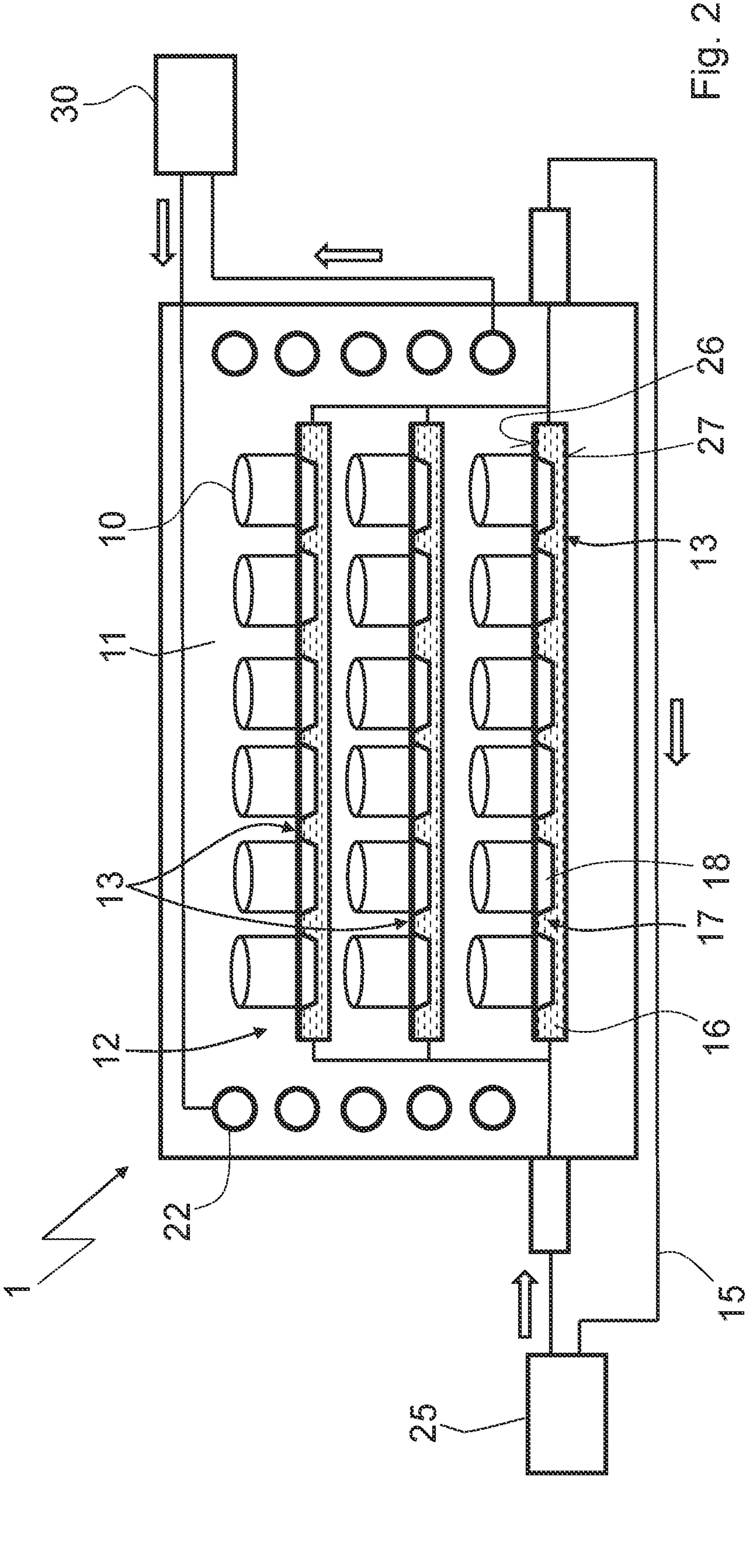
FIG. 2 is a schematic view of an embodiment of a freeze drying plant having a plurality of reception plates in accordance with the invention that are arranged in levels above one another.

FIG. 2 shows a further embodiment of a freeze drying plant 1 for drying products 10 containing liquid, wherein a reception device 12 having a plurality of reception plates 13 arranged above one another is introduced into the vacuum chamber 11. A condenser 22 is furthermore introduced within the vacuum chamber 11 and the condenser 22 is fluidically connected to a condenser unit 30 to cool the condenser 22.

The products 10 stand on the upper side of the respective reception plates 13 that are in turn set up in a sandwich-like manner by an upper plate wall 26 and a lower plate wall 27 and the fluid space 17 located therebetween. The sound generators 18 are arranged within the fluid space 17, with the fluid space 17 being filled with cooling fluid 16 that is fluidically connected to the unit 25 via the fluid circuit 15.

The embodiment shows that the reception plates 13 having the sandwich design also arranged in multiple form above one another can form the reception device 12 so that the reception plates 13 form the level bases in a certain manner that are each formed in a sandwich-like manner. The sound device shown in FIG. 1 in accordance with this embodiment can also control the sound generators 18 individually, group-wise or all together to introduce the ultrasound into the products 10 at frequencies of, for example, 10 kHz to 100 kHz, with the introduction, however, preferably—but not necessarily—taking place in pulsed form, for example with pulses from the infrasound range, in particular at pulse frequencies of 0.01 Hz to 20 Hz.

The invention is not restricted in its design to the preferred embodiment specified above. A number of variants is rather conceivable that also makes use of the solution shown with a generally differently designed embodiment. All the features and/or advantages, including any construction details or spatial arrangements, originating from the claims, the description, or the drawings can be essential to the invention both per se and in the most varied combinations.

REFERENCE NUMERAL LIST

1 freeze-drying plant
10 product
11 vacuum chamber
12 reception device
13 reception plate
14 cooling system
15 fluid circuit
16 cooling fluid
17 fluid space
18 sound generator
19 condenser
20 condenser chamber
21 intermediate valve
22 condenser
23 base plate
24 sound surface
25 unit
26 upper plate wall
27 lower plate wall
28 support surface
29 housing body
30 condenser unit
31 sound device

The invention claimed is:

1. A freeze drying plant for drying products containing liquid, comprising:
- a vacuum chamber configured to receive the products containing liquid;
- a reception device having at least one reception plate onto which the products containing liquid can be placed;
- a cooling system having a fluid circuit is configured to cool and/or to heat the products by a cooling fluid conducted in the fluid circuit;
- wherein the reception plate has at least one closed fluid space that is connected to the fluid circuit and through which the cooling fluid flows;
- at least one sound generator configured to introduce ultrasound into the products during a drying phase, the sound generator being disposed in the fluid space so as to be flowed around by the cooling fluid.

2. The freeze drying plant in accordance with claim 1, wherein:
- the reception plate has a superficial extent and is configured as double-walled with an upper plate wall and a lower plate wall between which the fluid space is formed;
- at least one support surface for support of the products is formed on the upper of the upper plate wall; and
- the at least one sound generator is arranged on a lower side of the upper plate wall.

3. The freeze drying plant in accordance with claim 1, further comprising a coolable condenser on which liquid removable from the products in a drying phase is precipitated from a vapor phase.

4. The freeze drying plant in accordance with claim 3, further comprising a condenser chamber, the coolable condenser being received in the condenser chamber, and the condenser chamber being connected to the vacuum chamber by an intermediate valve.

5. The freeze drying plant in accordance with claim 3, wherein the coolable condenser is configured together with the products that can be introduced in the vacuum chamber.

6. The freeze drying plant in accordance with claim 1, wherein the reception plate forms a base plate of the vacuum chamber that bounds the vacuum chamber at a lower side.

7. The freeze drying plant in accordance with claim 2, wherein the upper plate wall is formed as part of a housing body surrounding the vacuum chamber.

8. The freeze drying plant in accordance with claim 1, wherein the reception device has a plurality of reception plates arranged in levels above one another and having the fluid spaces formed thereby for receiving a plurality of the products.

9. The freeze drying plant in accordance with claim 3, wherein the coolable condenser is disposed in the vacuum chamber such that it surrounds the reception device having the products arrangeable therein.

10. The freeze drying plant in accordance with claim 1, wherein the at least one sound generator is configured to introduce ultrasound into the products at an ultrasonic frequency of 10 kHz to 100 kHz.

11. The freeze drying plant in accordance with claim 1, further comprising at least one sound device configured to introduce ultrasound into the products at an ultrasonic frequency of 10 kHz to 100 kHz in operative connection with the at least one sound generator.

12. The freeze drying plant in accordance with claim 11, wherein at least one the sound device is configured to introduce the ultrasound into the products in a pulsed manner in operative connection with the at least one sound generator.

13. The freeze drying plant in accordance with claim 12, wherein the at least one sound device is configured in operative connection with the sound generator to introduce ultrasound into the products by pulses in the range of infrasound of 0.1 Hz to 20 Hz.

14. The freeze drying plant in accordance with claim 2, wherein the at least one sound generator comprises a plurality of sound generators arranged next to one another at a lower side of the upper plate wall and within the fluid space, with the sound generators each having a dish shape with a sound surface by which the sound generators are arranged at the upper plate wall so that ultrasound can be superficially introduced into the upper plate wall.

* * * * *